United States Patent [19]

Nakagawa et al.

[11] Patent Number: 4,670,209
[45] Date of Patent: Jun. 2, 1987

[54] VULCANIZING METHOD FOR A TIRE PRESS

[75] Inventors: Kazuhiko Nakagawa; Itaru Amano, both of Kobe; Yasuhiko Fujieda, Hyogo, all of Japan

[73] Assignee: Kabushiki Kaisha Kobe Seiko Sho, Kobe, Japan

[21] Appl. No.: 836,062

[22] Filed: Mar. 4, 1986

[30] Foreign Application Priority Data

Mar. 26, 1985 [JP] Japan .................. 60-62642

[51] Int. Cl.$^4$ .............. B29C 35/04; B29C 35/00
[52] U.S. Cl. .................. 264/315; 264/326; 425/36; 425/43; 425/48; 425/52
[58] Field of Search ............ 264/315, 326; 425/23, 425/36, 43, 48, 52

[56] References Cited

U.S. PATENT DOCUMENTS 2,874,405 2/1959 Stanford .................. 264/315
3,396,221 8/1968 Balle et al. .................. 264/315

FOREIGN PATENT DOCUMENTS 42-13241 7/1967 Japan .
48-79282 10/1973 Japan .
52-37518 3/1977 Japan .
56-148539 11/1981 Japan .

Primary Examiner—Jan H. Silbaugh
Assistant Examiner—Neil Michael McCarthy
Attorney, Agent, or Firm—Oblon, Fisher, Spivak, McClelland & Maier

[57] ABSTRACT

A green tire vulcanizing press including a lower die having a heat source, an upper die capable of being opened and closed relative to the lower die and having a heat source, a shaping bladder received in a bladder well disposed in a central part of the lower die, and a hot pressure medium supplied into the bladder, the bladder well is made movable vertically and an upper clamp ring for the shaping bladder is held stationary while a lower clamp ring is provided vertically movably, whereby the shaping for a green tire as well as the separation of the bladder from the tire and removal of the tire after the vulcanizing press work are performed through vertical movements of the lower clamp ring and the bladder well under a fixed state of the upper clamp ring.

2 Claims, 4 Drawing Figures

VULCANIZING METHOD FOR A TIRE PRESS

BACKROUND OF THE INVENTION

1. Field of the Invention:

The present invention relates to a vulcanizing method for a tire press, especially a post-in-well type tire press, in which a green tire is loaded into a cavity formed by upper and lower dies capable of being opened and closed, a shaping bladder is then brought into close contact with the inner surface of the green tire, and the upper and lower dies are heated and a hot pressure medium is fed into the bladder to effect a vulcanizing press for the tire, a central mechanism of the tire press being so improved as to permit simplification of operations in the vulcanizing press as well as satisfactory structural simplification and functionalization as required.

2. Description of the Prior Art:

A tire press which performs a vulcanizing press for a green tire by means of a lower die having a heat source, an upper die capable of being opened and closed relative to the lower die and having a heat source, a shaping bladder provided within a bladder well formed centrally in the lower die, and a hot pressure medium fed into the bladder, is well known as a so-called post-in-well type tire press, and the following prior art examples exist.

In the tire press disclosed in Japanese Patent Publication No. 37518/77, although details are as described in the published specification thereof, a bladder housing cylinder 6 is fixed centrally to a lower die 4; clamp portions 14, 15 at a central upper end of a cylindrical bag-like bladder 17 having a closed upper end and an open lower end are supported for vertical movement by a piston rod 13 of a hydraulic cylinder 10 disposed in a central position of the bladder housing cylinder 6; and clamp portions 19,20 of the bladder 17 are supported by the hydraulic cylinder 10 itself being capable of being vertically moved by drive means 7 or 37, 41, the bladder 17 being raised into a green tire by the hydraulic cylinder 10 and drive means 7 or 37, 41 during vulcanization of a tire, while after completion of vulcanization, the upper and lower clamp portions 14, 15, 19, 20 of the bladder 17 are brought down into the bladder housing cylinder 16 by the hydraulic cylinder 10 and drive means 7 or 37, 41. (The above reference numerals are from the above patent publication, and the following parenthesized reference numerals are also from related publications concerned.)

In the tire press disclosed in Japanese Patent Laid-Open Publication No. 148539/81, a central mechanism 38 a lower bead ring 186 is provided at an upper end of a sleeve 185 which is fitted in a longitudinal bore member 180 vertically movably through actuators 188, 189, the longitudinal bore member 180 being fixed centrally to a lower die; a central post 200 is inserted centrally into the longitudinal bore member 180 vertically movably through a rod 252 of a piston cylinder assembly 251; an upper bead clamp 202 which holds an upper end of a shaping bladder 203 is attached to the post 200 so as to movable vertically together with the post 200; and a lower bead clamp 201 which holds a lower end of the shaping bladder 203 is connected to a rod 220 of a piston cylinder assembly 219 so as to be vertically movable independently of the post 200, whereby, during vulcanization of a tire, the bladder 203 which is received in the sleeve 185 in a twice-folded state by approach of the upper and lower bead clamps 202, 201 is positioned centrally in the tire which has been received by the sleeve 185 in a raised position and then brought down together with the sleeve. Thereafter the upper and lower bead clamps 202, 201 close to each other are vertically separated, allowing them to come into contact with the inner surface of the tire, while after completion of vulcanization the sleeve 185 is raised to lift the tire from the lower die surface and at the same time the upper and lower bead clamps 202, 201 are moved toward each other and thereby separated from the inner surface of the tire. The bladder 203 is thus received in a twice-folded state in the sleeve 185 by the relative movement of the upper and lower bead clamps 202, 201 caused by rise of the sleeve 185.

In the tire press disclosed in Japanese Patent Publication No. 13241/67, a pipe 9 which holds a bead forming portion 8 is vertically movably disposed in a central part of a lower die half 3; lower end clamp portions 29, 31 of a blast hose 27 as a bladder are attached to a holding plate 32 fixed to an upper end of a pipe 34 which is inserted centrally into the pipe 9 vertically movably; and upper end clamp portions 28, 30 of the blast hose 27 are attached to an upper end of a rod 36 which is vertically movably provided in the pipe 34 through a piston 38 and which extends through the holding plate 32, whereby, during vulcanization of a tire, the pipe 9 is raised to receive the tire through its bead forming portion 8. A pipe 15 is then vertically movably on a central side of an upper die half 10 goes down and the tire is gripped from above and below by a bead forming portion 12 of the pipe 15. Thereafter, the rod 36 raises the pipe 34 in a raised position, allowing the upper end clamp portions 28, 30 of the blast hose 27 at the upper end of the rod 36 to come into contact with the bead forming portion 12, and the pipe 34 is further raised, thereby allowing the blast hose 27 to be engaged with the inner surface of the tire through rise of the lower end clamp portions 29, 31 of the blast hose 27, then the pipes 15, 9, 34 are brought down synchronously to set the tire onto the lower die half 3, followed by closing with the upper die half 10, while after completion of vulcanization the upper die half 10 is opened and the rod 36 is raised, allowing the upper end clamp portions 28, 30 to rise at the same time, thereby drawing out the blast hose 27 upward from the inner surface of the tire. The tire is raised from the lower die half 3 by rising of the bead forming portion 8 of the pipe 9, and the blast hose 27 in an extended state is received in the pipe 9 by means of the rod 36 which descends together with the pipe 34.

Further, in the tire press disclosed in Japanese Patent Laid-Open Publication No. 79282/73, a well having a bead forming ring 3 formed at an upper end thereof is disposed in a central part of a lower segment die 11 so as to be movable vertically by means of a cylinder 13, and a clamp 7 having clamp rings 5, 6 for fixing upper and lower ends of a bellows 1 as a bladder is provided in the well vertically movably through an adjusting piston 8, whereby during vulcanization of a tire the bellows 1 is brought into contact with the inner surface of the tire set on the lower die half 11, with rising of the clamp 7, while after the vulcanization the upper die half 10 is opened and the well is raised to lift the tire from the lower die half 11, at the same time the clamp 7 is brought down into the well, thereby drawing out the bellows 1 from the inner surface of the tire and placing it in a twice-folded state within the well.

The above are summaries of the prior art tire presses mainly about the respective central mechanisms as nuclei of vulcanization and the contents of bladder motions are thereby performed. In all of those prior art tire presses, a well is fixed or made movable vertically and upper and lower clamp rings which hold upper and lower ends of a bladder received in a well are moved in a vertical direction relatively or synchronously to effect charge and discharge of the bladder with respect to the inner surface of the tire and also effect separation of the tire from the lower die.

The above prior art tire presses are characterized by the following problems. In the tire press disclosed in Japanese Patent Publication No. 37518/77, the bladder housing cylinder 6 or the bladder well is stationary, so in order to take out the vulcanized tire from the lower die it is necessary to provide mechanism and operation for opening a chuck 61 of an upper beam of the press, clamping an upper bead portion of the tire between the chuck 61 and a bead ring of an upper die 65 and then opening a dome 6 and the upper die 65 upward. Moreover, for relatively moving the central upper end clamp portions 14, 15 and lower end clamp portions 19, 20 of the bladder 17, two lift mechanisms are required which include the hydraulic cylinder 10 and the drive means 7 or 37, 41 for moving the cylinder 10 itself. Further, unlike the conventional cylindrical bladder, the bladder 17 used therein is in the form of a cylindrical bag whose upper portion is closed, so not only the clamp portions 14, 15 at the central upper end of the bladder are required to have a special gripping structure different from the conventional clamp ring, but also this central upper end portion must have a larger wall thickness than the other portions. As a whole, the mechanism and structure, including the composite structure and operation for vertical movement using the hydraulic cylinder 10 and drive means 7 or 37, 41. This and the troublesome control using the composite operation are disadvantageous factors. In the tire press disclosed in Japanese Patent Laid-Open Publication No. 148539/81, the sleeve 185 in contact with the well is movable vertically, thereby permitting the vulcanized tire to be lifted and removed from the lower die. But, since the upper and lower bead clamps 202, 201 for the bladder 203 are vertically movably provided on the central post 200, there are required composite structure and operation for vertical movement as in the foregoing patent publication No. 37518/77. More particularly, in contacting the bladder 203 with the inner surface of the tire, the upper and lower bead clamps 202, 201 are drawn close to each other and positioned in a central part of the tire, then the clamps 202, 201 are moved and expanded vertically in opposite directions. Therefore, accurate control for those operations is extremely complicated, and in separating the bladder 203 after vulcanization from the inner surface of the tire, it is necessary to bring down the upper bead clamp 202 while raising the lower bead clamp 201. Moreover, in shaping a green tire, the upper bead ring 202 is raised while lowering the lower bead ring 201, so in a chuck assembly 55 which holds the tire, it is necessary to bring it down in synchronism with the descent of the lower bead ring 201 during shaping. These composite operations are extremely troublesome and there is a disadvantage in point of more complicated structures of devices required. Further, in both of the above prior art tire presses, the bladder is stowed in a twice-folded state, so there is a fear also with respect to durability of the bladder.

The tire press disclosed in Japanese Patent Laid-Open Publication No. 13241/67 is characterized by having a centering device 46, but as to its central mechanism, the pipe 9 in contact with the well is provided vertically movably, but the lower end clamp portions 29, 31 for the blast hose 27 in contact with the bladder are held by the vertically movable pipe 34 and the upper end clamp portions 28, 30 are attached to the rod 36 which is vertically movable held by the pipe 34. Thus, due to a vertically movable structure of both upper and lower bladder clamps, there are required complicated composite structure and troublesome composite operations like those in the foregoing two prior art tire presses. Moreover, stowing the blast hose 27 in an extended state within the well is disadvantageous in that the lift stroke becomes larger and the device required below the lower die becomes larger in size.

In the tire press disclosed in Japanese Patent Laid-Open Publication No. 79282/73, the well is made movable vertically and a single clamp 7 for fixing upper and lower ends of the bellows 1 as the bladder is provided in the well vertically movably, whereby a structural and operational simplification can be attained as compared with the foregoing three prior art tire presses. However, the fact that the bladder moves integrally in fixed relation to a single clamp 7 while the positions of the upper and lower clamp portions of the bladder remain unchanged, in other words, the fact that the distance between the upper and lower ends of the bladder is unchanged in the shaping operation prior to vulcanization of a green tire, involve a problem in effecting a smooth loading of the bladder for the tire in conformity with changes in shape and size of the tire inner surface. In addition, the shaping function for obtaining superior tire uniformity may not be fulfilled to a satisfactory extent. Further, since the bladder is stowed in a twice-folded state, there is a fear also with respect to durability of the bladder. Additionally, the stroke of the adjusting piston 8 for vertical movement of the clamp 7 becomes considerably large, making it difficult to obtain compact equipment.

SUMMARY OF THE INVENTION

In the present invention, in order to overcome the above-mentioned problems of the conventional post-in-well type tire presses; a bladder well is vertically movably provided and an upper clamp ring of a shaping bladder is fixed while a lower clamp ring is made movable vertically, whereby the shaping of a green tire and the separation of the bladder and removal of the tire after vulcanizing press are performed through vertical movements of the lower clamp ring and the bladder well in a fixed state of the upper clamp ring. More particularly, in a green tire vulcanizing press including a lower die having a heat source, an upper die capable of being opened and closed relative to the lower die and having a heat source, a shaping bladder received in a bladder well disposed in a central part of the lower die, and a hot pressure medium supplied into the bladder, the bladder well is made movable vertically and a lower bead ring is fixed to an upper end of the bladder well, an upper clamp ring for the bladder is fixed to a center post extending upright through the center of the bladder well and through a buffer means at its lower end, and a lower clamp ring is held for vertical motion independently of the well, whereby the bladder well is brought down until the lower bead ring coincides with the lower die, whereupon a green tire is loaded onto the lower die past the bladder projecting upward from the well. Then the bladder is brought into pressure contact with the inner surface of the tire by raising the lower clamp ring and supplying a hot pressure medium into the bladder. After closing and clamping of the upper die relative to the lower die and completion of a vulcanizing press for the green tire conducted under continuous supply of the hot pressure medium and heating of the dies, the upper die is opened and the bladder well is raised to push up and remove the vulcanized tire from the lower die, and the lower clamp ring is brought down to withdraw and separate the bladder from the inner surface of the tire.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF PREFERRED EMBODIMENTS

A preferred embodiment of the present invention will be described in detail hereinbelow with reference to FIGS. 1 to 4.

Figure 1:
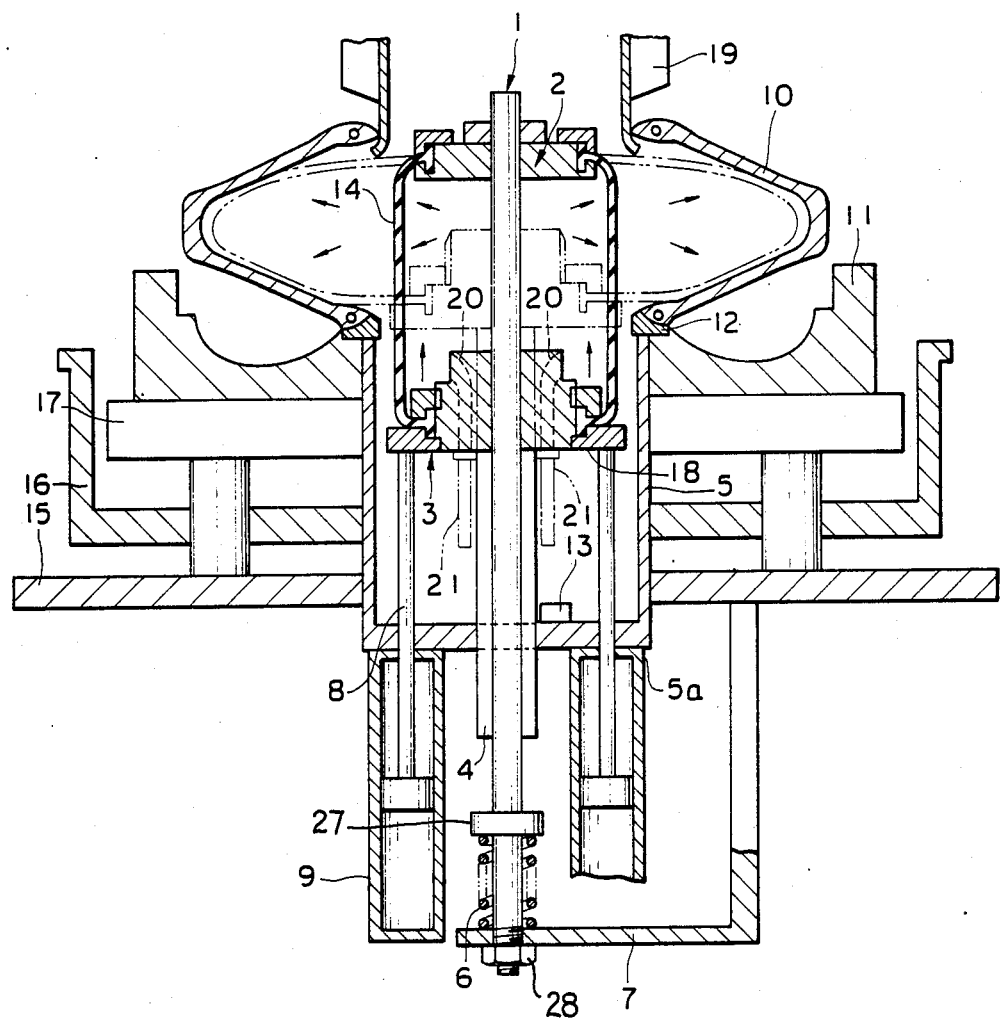
FIG. 1 is a front view in longitudinal section of a principal portion in shaping operation according to an embodiment of the present invention.

As shown in FIG. 1, a lower die 11 is fixed on a base 15 through a dome 16 and a hot platen 17, and a bladder well 5 is vertically movably disposed in a central portion of the lower die 11, the bladder well 5 having a lower bead ring 12 at an upper opening end thereof. A center post 1 is disposed through the center of the bladder well 5 and a lower end of the post 1 projecting downward from the bottom of the well 5 is supported by a support bracket 7 attached to the base 15, through a buffer member such as a cushion spring 6. To an upper part of this fixed center post 1 is fixed an upper clamp ring 2 which holds an upper end of a shaping bladder 14, while a lower clamp ring 3 which holds a lower end of the bladder 14 is fitted on the post 3 vertically movably through a hub 18 and a stem 4. As a drive source for this vertical movement there is used, for example, a hydraulic cylinder 9 attached to the bottom of the bladder well 5, and a piston rod 8 of the cylinder 9 is connected to the ring 3 side to move the ring up and down, thereby permitting shaping and vulcanizing press for a green tire 10.

Figure 2:
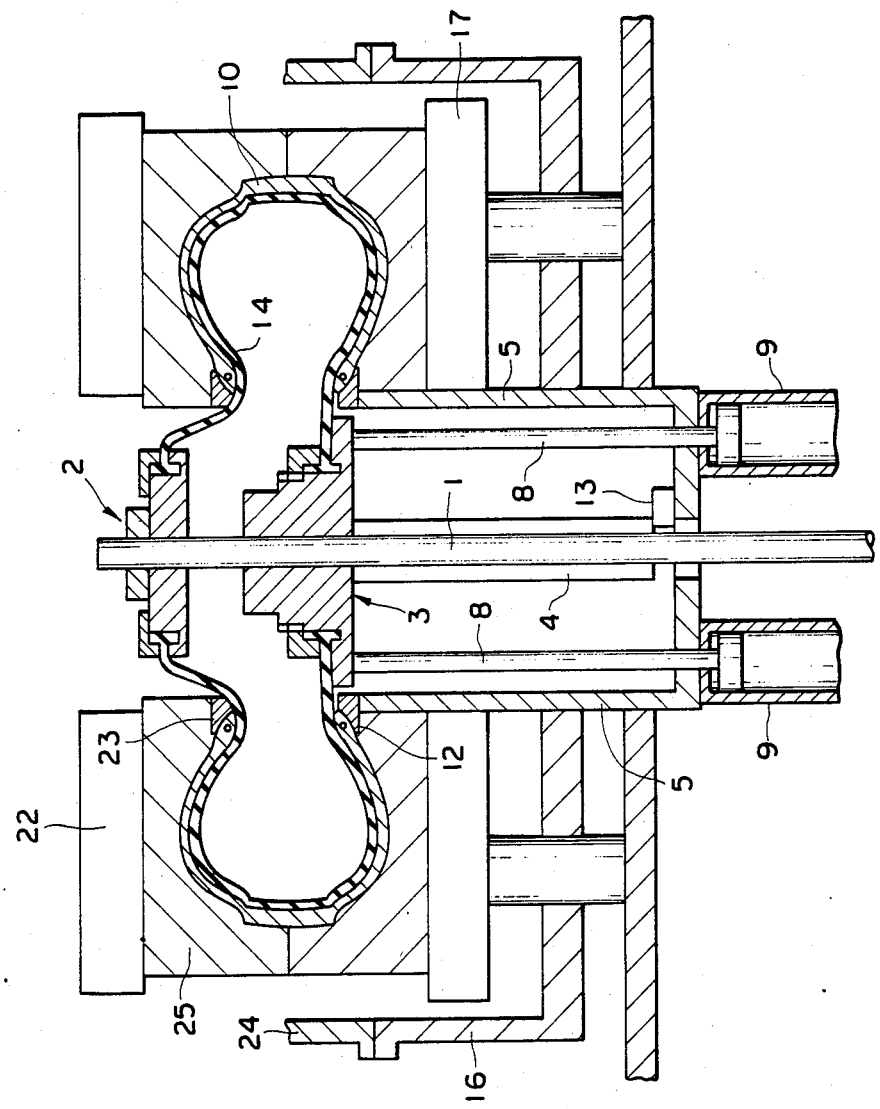
FIG. 2 is a front view thereof in vulcanizing operation.

More specifically, reference is here made to FIG. 1 in which the green tire 10 is set on the lower die 11 while its upper bead portion is held by a paddle 19 of a vertical loader or the like, ready for shaping. The bladder well 5 is in its lowermost position and the lower bead ring 12 is in engagement with a bead receiving portion of the lower die 11. The center post 1 is projectingly fixedly in its solid line position and the upper clamp ring 2 is positioned above the well 5, while the lower clamp ring 3 is in a lowered position, whereby the bladder 14 is held in an extended state, with its upper portion side projecting from the well 5. In this state, the piston rod 8 of the hydraulic cylinder 9 is raised, thereby allowing the lower clamp ring 3 to rise from its solid line position to its chain line position, and a hot pressure medium such as steam is supplied into the bladder 14 through a hot pressure medium supply/discharge means comprising hot pressure medium supply/discharge holes 20 and pipes 21 connected to the holes 20 which holes and pipes are provided by utilizing the hub 18, of the lower clamp ring 3 in a known manner, whereby the bladder 14 is expanded toward the inner surface of the tire smoothly while its upper portion on the side of the upper clamp ring 2 on the center post 1 held in the fixed position is allowed to serve as a deformation fulcrum of the bladder, and the bladder comes closely into pressure contact with the inner surface of the tire by virtue of the hot pressure medium, and thus shaping for the tire is started. Upon retraction of the tire loader, an upper die 25 having a hot platen 22, an upper bead ring 23 and a dome 24 corresponding to the dome 16, as shown in FIG. 2, is closed and clamped relative to the lower die and a vulcanizing press for the tire 10 is performed continuously under heating of both dies 11 and 25 and continuous supply of the hot pressure medium. At this time, an entire compressive shock induced by closing of the upper die 25 can be absorbed by the buffer member such as the cushion spring 6 provided at the lower end of the center post 1. Further, a stopper 13 is disposed on the bottom side of the bladder well 5 as shown in FIGS. 1 and 2 whereby the stem 4 on the side of the lower clamp ring 3 can be locked in its raised position to keep the position of the ring 3 stationary.

Figure 3:
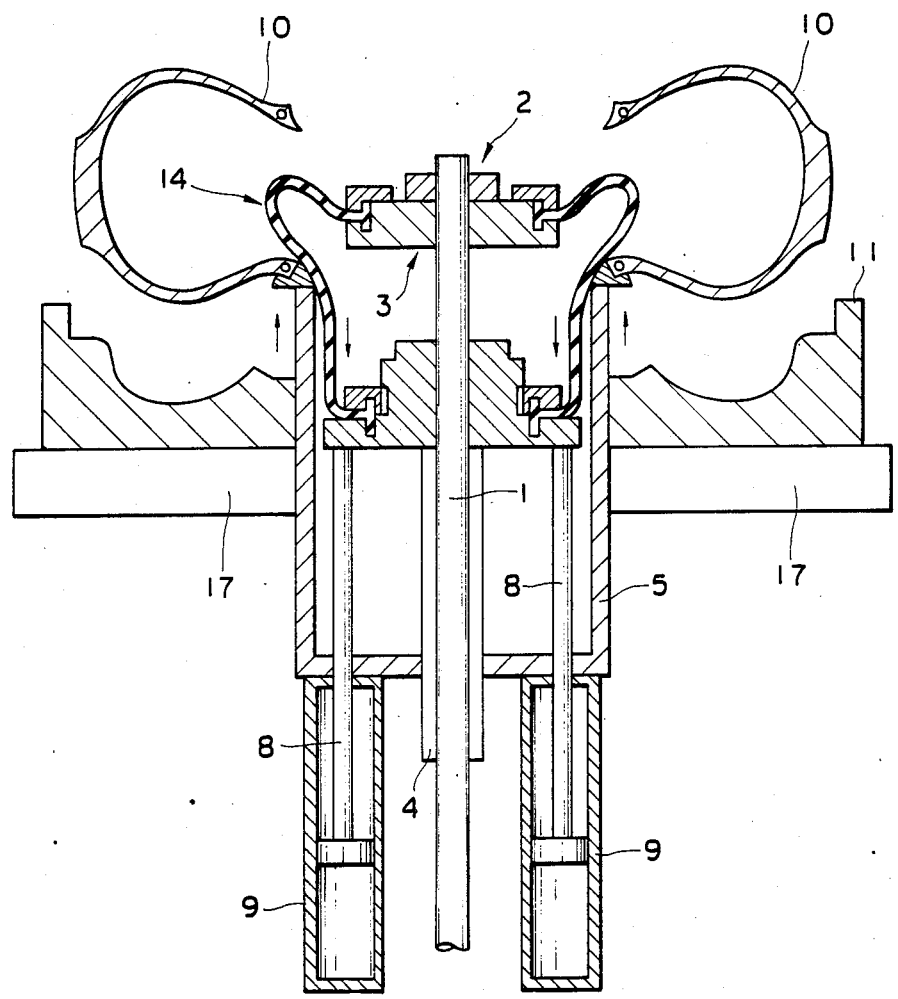
FIG. 3 is a front view thereof showing a bladder as separated from a tire after vulcanization.

After completion of the vulcanizing press work required, the upper die 25 is opened and retracted relative to the lower die, the supply of the hot pressure medium is stopped, the bladder well 5 is raised and the vulcanized tire 10 is pushed up and separated from the surface of the lower die 11 through the lower bead ring 12, as shown in FIG. 3. At the same time, the lower clamp ring 3 is brought down, whereby the bladder 14 is separated from the inner surface of the tire 10 and extended into the well 5.

Figure 4:
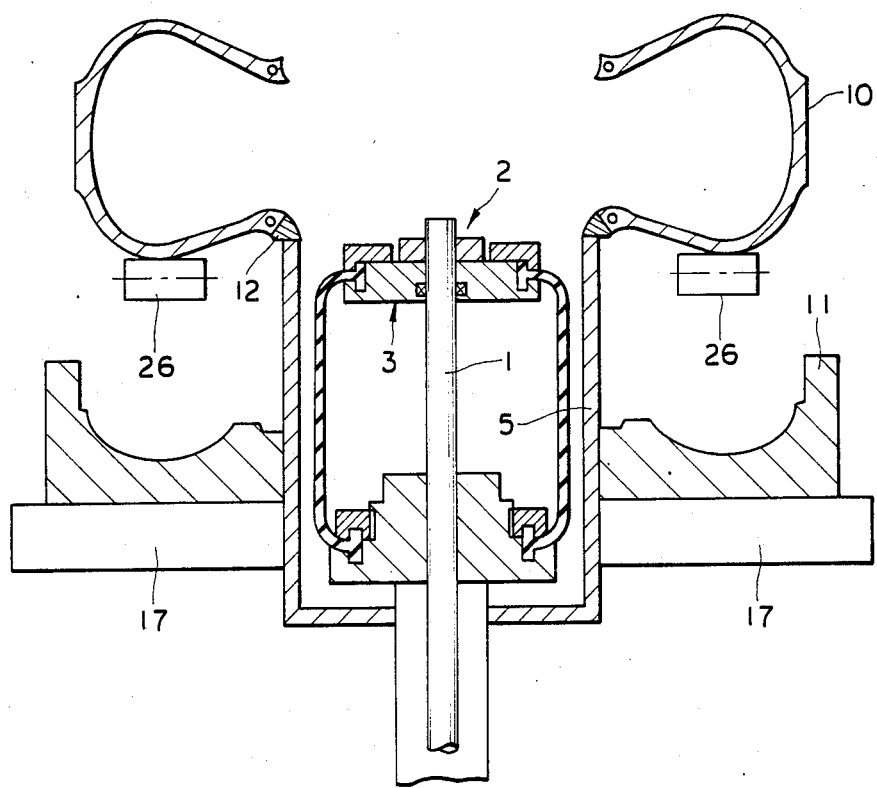
FIG. 4 is a front view thereof showing the tire about to be taken out after vulcanization.

FIG. 4 shows an uppermost position of the bladder well 5 and a lowermost position of the lower clamp ring 3. In this state, support arms 26 of a tire removed device such as an unloader are moved up to positions under the tire 10 and support the tire in a known manner. Further, when the bladder 14 is completely stowed in the well 5, the vulcanized tire 10 is removed from the press.

During a series of operations from shaping through vulcanizing press up to removed of the tire described above, the upper clamp ring 2 in the present invention is kept stationary and such various vertical movements for the upper clamp ring as in the prior art are not necessary at all, thus making it possible to omit all of lift device and members and lift motions for the upper clamp ring 2. It is apparent that only the bladder well 5 and the lower clamp ring 3 suffice as moving members. This greatly contributes to the omission of the device required for the movements of the bladder with the central mechanism as a nucleus, especially the omission of the motion mechanism, as well as the simplification of operation and improvement of the press cycle efficiency.

As the lower die 11 having a hot platen and the upper die 25 capable of being opened and closed relative to the lower die and having a heat source, both used in the invention, there may be used various types employed in the conventional post-in-well type tire presses, the details of which are here omitted. Although the bladder well 5 disposed vertically movably in a central portion of the lower die 11 is provided with a bottom portion 5a in the embodiment illustrated, such bottom portion is not always necessary. The well 5 may be in the form of a cylinder having upper and lower openings if the stopper 13 can be provided in another position through a bracket or the like. The stopper 13 can be designed freely according to allowable space and position; for example, it may be pivoted about a pivot shaft so that it can be engaged with and disengaged from the lower end of the stem 4, or it may be moved forward and backward for such engagement and disengagement, though not shown. The bladder well 5 can be moved vertically by a mechanical means such as a knockout lever or link because the vertical movement of the well itself is a simple vertical linear motion, only reciprocating between the bottom and top positions, not requiring a stepwise stop, though not shown. It is advisable not to use a hydraulic cylinder. The adoption of such mechanical means is desirable for the simplification of the mechanism and facilitation of maintenance. The center post 1 extending centrally through the bladder well 5 may be a solid post or a pipe, and as the buffer member provided at the lower end of the post there may be used an air cylinder in place of the cushion spring 6 used in the above embodiment. In the case of using the spring 6, the spring is disposed resiliently between a flange 27 and the bracket 7 and an end portion having a nut 28 is loosely inserted through the bracket 7, as illustrated in the drawings. The shaping bladder 14 is cylindrical and may be of the same structure as the conventional bladder. The upper and lower clamp rings 2 and 3 may have a known clamp structure. The hot pressure medium supply structure at the lower clamp ring 3 may also be the same as in the prior art as shown in the drawings. The upper clamp ring 2 may be fixed to the center post 1 by threads or by using a lock nut or by any other suitable means if such can be kept stationary. In this case, there may be adopted an adjustable fixing structure which can change the fixing position as necessary. As the mechanism for vertically moving the lower clamp ring 3 there may be adopted a mechanism comprising a screw shaft and a rotating nut with the shaft side being vertically moved in place of the cylinder mechanism comprising the hydraulic cylinder 9 and the piston rod 8. In starting shaping for the green tire 10 as shown in FIG. 1 in the embodiment illustrated, when the bladder well 5 having the lower bead ring 12 and the lower clamp ring 3 are in the lowermost positions, the tire 10 is placed on the lower bead ring 12 while being held by the paddle 19 of the tire loader, and fixed by the paddle 19, then the lower clamp ring 3 is raised and the hot pressure medium is introduced into the bladder 14. In actual operation, it is preferable that the hot pressure medium be supplied after the lower clamp ring 3 is raised up to the most suitable position. This is to prevent a premature supply of the hot pressure medium from causing the bladder 14 to expand and contact another member before contact with the inner surface of the tire.

According to the present invention there are obtained the following advantages. In the prior art, both upper and lower clamp rings which hold upper and lower ends of a bladder move up and down synchronously or relatively in an independent or combined fashion, such that a lift mechanism for each the upper and lower clamp rings as well as vertical motions are required. For example, the use of hydraulic cylinders as drive sources requires their installation in the limited space inside or outside the tire press well, thus leading to a complicated mechanism. More particularly, a synchronous or relative vertical movement of both upper and lower clamp rings requires a composite operation always taking the positional relation of the two into consideration. This requirement is apt to cause troublesomeness of operation and difficulty of control. Further, it is necessary that the bladder be stowed in a twice-folded state in order to shorten the stroke. Moreover, the movement and change in an extended state are disadvantageous in that a longer stroke results. On the other hand, in the present invention, a center post is fixedly disposed upright and centrally through the well and an upper clamp ring is fixed stationarily to an upper part of the center post. Further, a lower clamp ring and the bladder well having a lower bead ring are vertically movably disposed, the insertion of the bladder into the tire at the time of vulcanization as well as the separation of the bladder from the tire after vulcanization and the removal of the tire can be accomplished by the vertical movements of the lower clamp ring and the bladder well under a stationary state of the upper clamp ring. As a result, the lift mechanisms for the center post and upper clamp ring as well as their vertical motions can all be avoided, that is, the mechanisms required inside and outside the well can be simplified. In particular, the absence of a hydraulic cylinder mechanism in the well permits elimination of problems such as leakage of hydraulic fluid and band influence of heat which are attributable to the presence of a hydraulic cylinder mechanism in the well as in the prior art. Because of the fact that only the vertical movements of the bladder well 5 and lower clamp ring 3 occur in the present invention, there can be surely attained simplification of the mechanism and that of operation process, thus resulting in the fact that a large space is no longer necessary below the tire press and a compact machine design can be done easily. Also in the shaping function, since the lower clamp ring 3 is vertically movable, the bladder can be deformed for contact with the inner surface of a tire freely according to the size and shape of the tire. The shaping function for improving the tire uniformity is not likely to be impaired, and since the bladder moves relative to the upper clamp ring 2 which is kept stationary, it is possible to attain a proper positioning and an accurate motion control. Furthermore, the bladder can be stowed in an extended state within the well, without such an unnatural way of stowing as twice-folded, and so there is obtained a satisfactory durability of the bladder. Accordingly, there is no fear of contact of the bladder with another member at the time of insertion of the bladder into a tire. Thus, as a new vulcanizing means in a tire press, the present invention contributes to the solution of the problems involved in the conventional post-in-well type tire press.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vulcanizing method in a green tire vulcanizing press including a lower die having a heat source, an upper die capable of being opened and closed relative to the lower die and having a heat source, a shaping bladder received in a bladder well disposed in a central part of the lower die, and a hot pressure medium supplied into the bladder, wherein said bladder well is made movable vertically and a lower bead ring is fixed to an upper end of the bladder well; an upper clamp ring for the bladder is fixed to a center post extending upright through the center of the bladder well and through a buffer means at its lower end; and a lower clamp ring is held for vertical movement independently of the well, which comprises:

moving said bladder well downward until the lower bead ring coincides with the lower die;

pressure contacting the bladder with the inner surface of the tire by raising the lower clamp ring and supplying a hot pressure medium into the bladder;

closing and clamping the upper die relative to the lower die and completing vulcanizing pressing of the green tire under a continuous supply of the hot pressure medium and heating the dies;

opening the upper die and raising the bladder well for pushing up and removing the vulcanized tire from the lower die;

lowering the lower clamp ring so as to withdraw and separate the bladder from the inner surface of the tire and maintaining said upper clamp ring stationary during the foregoing steps.

2. A vulcanizing method as set forth in claim 1, which further comprises maintaining said center post stationary with said upper clamp ring during said foregoing steps.

* * * * *